(12) United States Patent
Bergman et al.

(10) Patent No.: US 7,296,330 B2
(45) Date of Patent: Nov. 20, 2007

(54) AUTOMOTIVE WHEEL ASSEMBLY REMOVAL APPARATUS

(75) Inventors: Theodore J. Bergman, Maria Stein, OH (US); Jon E. Bergman, Maria Stein, OH (US); John C. Huelsman, Maria Stein, OH (US)

(73) Assignee: West Central Ohio Tool Distributors, Ltd., Maria Stein, OH (US)

( * ) Notice: Subject to any disclaimer, the term of this patent is extended or adjusted under 35 U.S.C. 154(b) by 147 days.

(21) Appl. No.: 11/294,117

(22) Filed: Dec. 5, 2005

(65) Prior Publication Data

US 2006/0196028 A1    Sep. 7, 2006

Related U.S. Application Data

(63) Continuation-in-part of application No. 10/027,371, filed on Dec. 20, 2001, now Pat. No. 6,971,149.

(51) Int. Cl.
*B23P 19/04* (2006.01)

(52) U.S. Cl. .................................................... 29/254

(58) Field of Classification Search ............... 29/254, 29/255, 264, 275; 81/27
See application file for complete search history.

(56) References Cited

U.S. PATENT DOCUMENTS

| | | | |
|---|---|---|---|
| 1,629,003 A * | 5/1927 | Schonfeld | ............. 29/264 |
| 2,377,304 A | 6/1945 | Appel | |
| 2,779,089 A | 1/1957 | Allen | |
| 3,003,230 A | 10/1961 | Fornes | |
| 3,106,012 A | 10/1963 | Comer | |
| 3,336,652 A * | 8/1967 | Ullmo | ............. 29/254 |
| 4,185,372 A | 1/1980 | Dupree et al. | |
| 4,283,827 A | 8/1981 | Abel | |
| 4,675,968 A | 6/1987 | Bartlett | |
| 4,733,450 A | 3/1988 | Pool | |
| 4,831,904 A | 5/1989 | Agins | |
| 4,875,395 A | 10/1989 | Alvarez | |
| 4,884,611 A | 12/1989 | Schmidt | |
| 5,716,107 A | 2/1998 | Parker et al. | |
| 5,850,679 A | 12/1998 | Hoffman | |
| 5,887,666 A | 3/1999 | Chen et al. | |
| 5,991,994 A | 11/1999 | Crews | |
| 6,971,149 B2 * | 12/2005 | Berman et al. | ............. 29/254 |

* cited by examiner

*Primary Examiner*—David B Thomas
(74) *Attorney, Agent, or Firm*—The Webb Law Firm (57) ABSTRACT

A wheel assembly removal apparatus for use in the automotive maintenance and repair industry. The apparatus is adapted to remove a wheel assembly, and components thereof that may have become seized together, from a vehicle chassis for maintenance and repair while minimizing time and cost, and the possibility for damage to the assembly. The wheel assembly removal apparatus preferably incorporates, among other elements, a slide hammer assembly that includes a hammer secured to a hollow slide tube that is received on a slide shaft that also may incorporate a hammer stop near a distal end and a distally projecting support extension. A coupler is formed at a proximal end of the slide shaft and releasably engages an interchangeable rotor securing tool and or an axle impact bar. The interchangeable rotor securing tool attaches to the coupler and to a wheel assembly or rim mounting surface at the proximal end.

12 Claims, 8 Drawing Sheets

AUTOMOTIVE WHEEL ASSEMBLY REMOVAL APPARATUS

This application claims the benefit of the earlier filing of, and is a continuation-in-part application of U.S. utility patent application Ser. No. 10/027,371 filed Dec. 20, 2001 now U.S. Pat. No. 6,971,149 issued Dec. 6, 2005, which hereby incorporated by reference.

BACKGROUND OF THE INVENTION

1. Field of the Invention

This invention relates to tools and particularly to a tool adapted to remove a wheel assembly from a vehicle chassis for automotive maintenance and repair. More specifically, the invention relates to a durable, inexpensive, and reconfigurable apparatus for removal of the wheel assembly from the vehicle chasses of a plurality of original equipment manufacturer (hereafter also referred to as "OEM") automotive product lines.

2. Description of Related Art

In the various automotive vehicle industries, including for purposes of illustration but not limitation, wheel and brake servicing and repair, those with skill in the art have long-recognized the need for an improved method of removing the various components of a wheel assembly without damage that can occur to, for example without limitation, the rotors, hubs, bearings, spindles, and axles.

In the past, service personnel, technicians, and mechanics have had to resort to blow torches, mallets, hammers, pry bars, and the like to remove and break free the various wheel assembly components that may be seized together from the accumulation of dirt, dust, moisture, and from corrosion and cold welding that can occur from various forces, loads, and galvanic and frictional interaction between the wheel assembly components. Such corrosive and cold welding type seizing is further exacerbated by the combined effect of heavy load conditions experienced by many types of consumer, commercial, industrial, and military vehicles. Some technicians and mechanics also attempt to pull the assembly apart by securing pulling devices to one of the wheel assembly engagement members, typically referred to as studs or lugs by those having skill in the art. This method does not evenly distribute the pulling forces to the wheel assembly and often results in deformation and damage to the engagement members and to the wheel assembly, which can require replacement of the deformed and damaged parts, which further adds to and increases the labor and part maintenance costs.

Occasionally, vehicle manufacturers will suggest alternative removal methods including, for example, the installation of longer bolts or studs from the rear of the assembly that can be employed to force apart the components of the wheel assembly from the wheel hub, spindle, or axle. However, this method is generally ineffective to combat severely corroded parts and is generally incompatible for use with most OEM vehicle configurations such as, for example, four-wheel drive vehicles that incorporate complex axle component assemblies and difficult to access service configurations and vehicle locations.

As a result of such difficulty and in light of the increased expense and ineffectiveness of most prior art devices, mechanics generally resort to the pry bar, hammer, and mallet methods that typically impart unevenly applied impact forces, which most often deforms and damages the wheel assembly components including the hub, rotor, bearings, axle, and spindle.

As noted herein, the problem of seized wheel assembly components is especially common in vehicles that are adapted to carry frequently heavy loads and that are subject to particularly severe shock loads such as those experienced in off-road and various industrial and construction applications and environments. Removing the seized components of load carrying vehicles can take dozens of forceful hammer blows to the rotor, and often requires the use of a torch to create temperature differentials across and between the seized parts.

In severely corroded and seized situations, the torch is used to actually cut the non-removable parts from the assembly so that replacement components can be supplied. This torch removal technique is dangerous, time consuming, exhausting, and many times will cause damage to the components that would only otherwise require removal and servicing. As a result of such problems in removing and servicing various types of wheel assemblies and related components, many service facilities expend many extra man-hours each day removing seized components. Further, despite their best efforts, the technicians and mechanics often cannot avoid irreparable damage to the wheel assembly components during removal, the costs of which are borne in part by the facility, any warranty provider, and often in most part by the customer or vehicle owner.

What has been needed but as yet unavailable is a device that addresses some of the long-standing problems in the art. Some attempts have been made to improve devices for use in other technology areas. For example, the value of a slide hammer type device in imparting tensile impulse loads has been attempted in the automotive services industry.

Prior art devices and methods for applying tensile impulse loads have not been compatible for wide spread uses and do not properly impart effective and efficient axial forces. For example, in U.S. Pat. No. 3,106,012 to Corner and U.S. Pat. No. 3,003,230 to Fornes, slide hammer devices are incorporated in axle pullers. Even earlier, U.S. Pat. No. 2,377,304 to Appel incorporated a slide hammer into a device for pulling sleeves from internal combustion engines.

More recently, U.S. Pat. No. 4,283,827 to Abel utilized a slide hammer device in a tool for removing axle spindles. While these devices attempt to impart effective tensile impulse loads on the object intended to be pulled apart or removed, none of the attempts to date have offered the reliable and novel aspects contemplated by the present invention, nor have they been compatible for use with the myriad OEM vehicles and components presently in the marketplace.

Instead, the prior art devices have been markedly limited in application and compatibility and when not entirely effective for the intended or desired purpose, such devices have often failed to establish any effective solution to the particularly troublesome seized wheel assembly components that may be severely corroded and welded together. The limited attempts of the prior art that have sought to address the particular issues related to one type of wheel assembly have been unable to operate with wheel assembly designs other than the one or two configurations contemplated.

The need remains for an apparatus that can be easily setup and reconfigured to ensure substantially axial transfer of generally uniform forces, that can be utilized on a variety of vehicles, and that can more readily remove and separate the components of a corroded wheel assembly, while minimizing or eliminating potential damage to the assembly during unseizing and separation.

The present invention meets the above described and other needs without adding any complexity, inefficiencies, or significant costs to implementation in existing applications and environments. In fact, the preferred apparatus according to the present invention can be implemented with relatively low-cost materials and components that can be easily adapted according to the principles of the present invention. The various embodiments of the present invention disclosed are readily adapted for preferable ease of manufacture, low fabrication and setup costs, effectiveness of operation, and for wide compatibility with various OEM components. Further, service personnel, technicians, and mechanics can employ the device and apparatus according to the principles of the instant invention without any additional training and without any additional tooling or equipment other than the improved wheel assembly removal apparatus and the various configurations thereof that are contemplated herein.

SUMMARY OF THE INVENTION

In its most general configuration, the present invention advances the state of the art with a variety of new capabilities and overcomes many of the shortcomings of prior devices in new and novel ways. In one of the many preferable configurations, the wheel assembly removal apparatus incorporates, among other elements, a slide hammer assembly that includes a hammer secured to a hollow slide tube. The hollow slide tube receives a slide shaft upon which the hollow slide tube and hammer can be moved.

The slide shaft incorporates a hammer stop near the distal end and a distally projecting support extension. A coupler is formed at the proximal end of the slide shaft and is configured to releasably engage an interchangeable rotor securing tool. The interchangeable rotor securing or connecting tool releasably attaches to the coupler at the distal end and to a rim mounting surface at the proximal end. The term "interchangeable rotor securing tool" used throughout contemplates embodiments adapted to attach to a variety of differently configured wheel rim mounting surfaces, including wheel hubs, rotors, and other wheel assembly components and combinations thereof.

In operation, a user rapidly accelerates the hammer and slide tube, also referred to as the slide hammer assembly, from the proximal end of the slide shaft to impact the hammer stop, which creates an operational impact load when the hammer strikes the hammer stop and the linear momentum of the hammer is transferred to the shaft through the stop. The impact load is transferred through the slide shaft, the coupler, and the interchangeable rotor securing tool to the rim mounting surface, rotor, or other wheel assembly component. The impact load breaks loose the seized components of the wheel assembly, which may include, for example, wheel bearings, hub, rotor, and axle components, from the spindle and axle.

In one of many variations of the instant invention, the apparatus includes a plurality of engagement hole patterns, each containing at least two engagement holes formed on the interchangeable rotor securing tool. More specifically, one embodiment of the interchangeable rotor securing tool may preferably include a four engagement hole pattern, a six engagement hole pattern, an eight engagement hole pattern on a single tool, and combinations thereof.

Alternatively, the interchangeable rotor securing tool may include a three engagement hole pattern, a five engagement hole pattern, an eight engagement hole pattern on a single tool, and combinations thereof. Alternatively, each of the plurality of engagement hole patterns may be formed on individual interchangeable rotor securing tools. These engagement hole patterns are not limited to aligning with engagement members, but may also align with the bearing removal bolt patterns of many vehicles. Such engagement members can include OEM wheel lugs as well as fasteners inserted through holes formed in the wheel assembly.

The coupler is adapted to enable a single slide hammer assembly to be used with any number of interchangeable rotor securing tools for enhancing compatibility. Therefore, one slide hammer assembly may be used with any number of interchangeable rotor securing tools, which can be adapted for both foreign and domestic vehicles, including for example cars, trucks, vans, buses, aircraft, and recreation and military vehicles. The coupler may take the form of a male threaded connection on the slide shaft for engagement by a female threaded receiver on the interchangeable rotor securing tool. Alternatively, one with skill in the art can recognize that the coupler may be formed to include quick release type fasteners, cotter pin type fasteners, bayonet fasteners, and any number of other recognized joining methods.

Additional embodiments of the interchangeable rotor securing tool are adapted so that the tool can be securely coupled to the rim mounting surface to transfer a substantially axial impact load approximately uniformly to the rim mounting surface. This modification may be used with any of the preceding embodiments and incorporates an interchangeable rotor securing tool that is adapted to be in contact with a substantial portion of the rim mounting surface, rather than being limited to engaging only one engagement member. Then, with the engagement members received through one of the engagement hole patterns and fastened to the tool, the slide shaft is preferably applied to be approximately orthogonal to the rim mounting surface and will transfer substantially axial operational impact loads.

While it is preferable that all the engagement members be fastened to the tool to maximize the load distribution and minimize the potential for damaging the engagement members, the apparatus can function when fastened to at least one engagement member. Additionally, the substantial amount of contact area between the rim mounting surface and the tool, when properly connected, ensures a substantially distributed load transfer interface for the uniform transfer of separation impact loads from the tool to the rim mounting surface.

Further, the apparatus also preferably can include a support extension at the distal end of the slide shaft. The support extension allows the operator to rest the distal end of the apparatus on a support device during setup and operation, such as a jack stand. Therefore, the operator does not have to support the weight of the apparatus during setup or while in use. Additionally, with the support extension on a jack stand, the operator can ensure that the slide shaft is generally orthogonal to the plane of the rim mounting surface to maximize kinetic energy and load transfer efficiency. An additional variation of the support extension may include a distal end connection for securing additional tools. The apparatus may then be used as a tool to impart compressive impulse forces.

A further variation of any of the preceding embodiments may also include a dual hand operation mechanism. The mechanism requires that both of the operator's hands be on the moving portion of the apparatus, namely the hollow slide tube and hammer, prior to allowing the moving portion to slide on the slide shaft. This mechanism minimizes the possibility of the operator getting a hand caught between the hammer and the hammer stop.

Any of the preceding configurations and embodiments may also be adapted to include any one of a number of releasably engagable retainer assemblies. The retainer assembly loosely retains the wheel assembly to the vehicle chassis so that the operator, apparatus, and the wheel assembly are controlled when the impact load breaks free the seized components. The retainer assembly may in one variation include at least one fastener. One such embodiment incorporates at least one retainer bolt that loosely secures the wheel assembly to the vehicle chassis during operation.

For example, in one of many possible applications in the example of commercial truck vehicles, the OEM bolts that are used to tightly secure the bearing of the wheel assembly to the steering knuckle or chassis are removed and replaced with extra long bolts, such as bolts that are approximately 2" to 8", or longer as needed, which enable the wheel assembly to break free when the impact load is applied while being loosely connected to the vehicle chassis. Further, the retainer bolts restrain the wheel assembly and apparatus to the vehicle to control the breakaway of the wheel assembly from the vehicle and prevent the wheel assembly and the apparatus from dropping to the ground.

Additionally, further embodiments of the releasably engagable retainer assembly incorporates at least one flexible and adjustable retainer device. The flexible and adjustable retainer device may preferably include chains, wire ropes, elastomeric restraints, bungees, and any number of strap-like devices. These flexible and adjustable retainer devices may be releasably engaged by the interchangeable rotor securing tool or the slide shaft and may be wrapped around and through the wheel assembly chassis mount, steering knuckle, or virtually any vehicle chassis member that is securely attached to the vehicle frame.

Any of the preceding configurations and embodiments may also be adapted to include a means for attaching the releasably engagable retainer assembly to the apparatus when not in use. One such embodiment may include retainer bolt recesses formed into the hammer stop in which the retainer bolts may be secured when the apparatus is not in use. Additional embodiments may include retainer bolt recesses in the hammer, interchangeable rotor securing tool, or the device support extension. Similar attachment means may be incorporated into the flexible adjustable retainer device embodiments.

In yet another contemplated modification to any of the embodiments disclosed herein, the instant invention is also directed to an automotive wheel assembly removal apparatus that includes an interchangeable rotor securing tool that is mounted to the coupler of the slide shaft as before, but that is formed with a plurality of engagement slots adapted to facilitate compatibility with a wide variety of possible vehicle chassis wheel assemblies having various rotor plate dimensions. In this variation of the other embodiments described herein, the slots cooperate to receive a plurality of rocker clamps each adjustably secured to a respective one of the plurality of engagement slots. Preferably, the rocker clamps are threaded to be fastened to the slots with a bolt, or the clamps are formed with a through hole to be secured to the slots with a nut, bolt, and washer fastener configuration. In this configuration, the slots of the interchangeable rotor securing tool cooperate with the rocker clamps to be adjustable so that the removal apparatus can be configured for securing to wheel assemblies having rotor plates with any thickness and any diameter.

In the instant alternative to any of the embodiments described herein, the wheel assembly removal apparatus may further incorporate at least one axle impact bar that is sized and adapted to transfer the operational impact load of the removal apparatus directly to an axle of the wheel assembly. Preferably the axel impact bar is received within the interchangeable rotor securing tool to transfer the contemplated impact loads from the securing tool and or the slide hammer shaft to the axle of the wheel assembly. More specifically, the axle impact bar can be sized so that it engages the axle and the slide shaft whereby, during operation, the impact loads are directly communicated to the axle of the wheel assembly.

A configuration is further contemplated where the axle impact bar is threadably received into the interchangeable rotor securing tool and or the slide shaft and similarly received into the axle of the wheel assembly. In this arrangement, the slide shaft may also be further configured with one or more rotation handles that can facilitate threading of the axle impact bar into the axle of the wheel assembly.

In addition to any of the preceding variation and modifications, the instant invention also contemplates configurations adapted to be used in conjunction with heating sources such as a torch, which may be necessary for use in unseizing and removing a troublesome vehicle wheel assembly. More particularly, one or more apertures may be formed in the interchangeable rotor securing tool that is sized to receive, for purposes of example without limitation, the nozzle of an acetylene torch or the like, that can be positioned to heat one or more components of the seized wheel assembly during operation of the wheel assembly removal apparatus so as to further increase the stresses across the component interfaces of the seized wheel assembly while the impact loads of the slide hammer are imposed on the wheel assembly.

Any of the preferred embodiments of the invention and modifications and variations thereof can be further adapted to incorporate a tensioner assembly with a second interchangeable rotor securing tool. The tensioner assembly is preferably adapted to preload in tension the rotor or vehicle component to be removed in bias against the vehicle chassis and or wheel assembly undergoing maintenance.

The tensioner assembly typically will incorporate a cross bar received about the second interchangeable rotor securing tool, which is arranged to establish the preload, usually from a pneudraulic plunger cylinder, between the removal tool as attached to the rotor or other component to be removed, and the vehicle chassis and or wheel assembly. The tensioner assembly will also preferably include, among other components, a series of compressively loaded and adjustable push links and tensily loaded tension rods and or a tension cylinder, as well as possibly useful push rods.

These variations, modifications, and alterations of the various preferred embodiments may be used either alone or in combination with one another as can be better understood by those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures, wherein like reference numerals across the several drawings, figures, and views refer to identical, corresponding, and or equivalent elements, features, components, and parts:

Also, in the various figures and drawings, the following reference symbols and letters are used to identify significant features, dimensions, objects, and arrangements of elements described herein below in connection with the several figures and illustrations: A, AR, CS, HS, JS, Li, L, L', R, RM, M, SK, and WA.

DESCRIPTION OF THE PREFERRED EMBODIMENTS

The wheel assembly removal apparatus according to the present invention demonstrates a significant step forward in the field of vehicle maintenance tools, and more specifically in the field of wheel assembly removal tools. Many undesirable, ineffective, and unsuccessful attempts have been made to create a wheel assembly removal apparatus having the convenience and efficiency of the present invention.

The preferred wheel assembly removal apparatus has wide application for all wheel based vehicles that incorporate wheel or rotating assemblies that are subject to removal for maintenance and replacement. The preferred configurations and described alternatives, modifications, and variations of the wheel assembly removal apparatus of the instant invention overcome prior shortcomings and accomplish new and novel solutions to the prior art problems with vastly improved configurations and arrangements of inventive elements that are uniquely configured, and which demonstrate previously unavailable capabilities, and wide compatibility for use with any original equipment manufacturer (OEM) vehicles.

Figure 1:
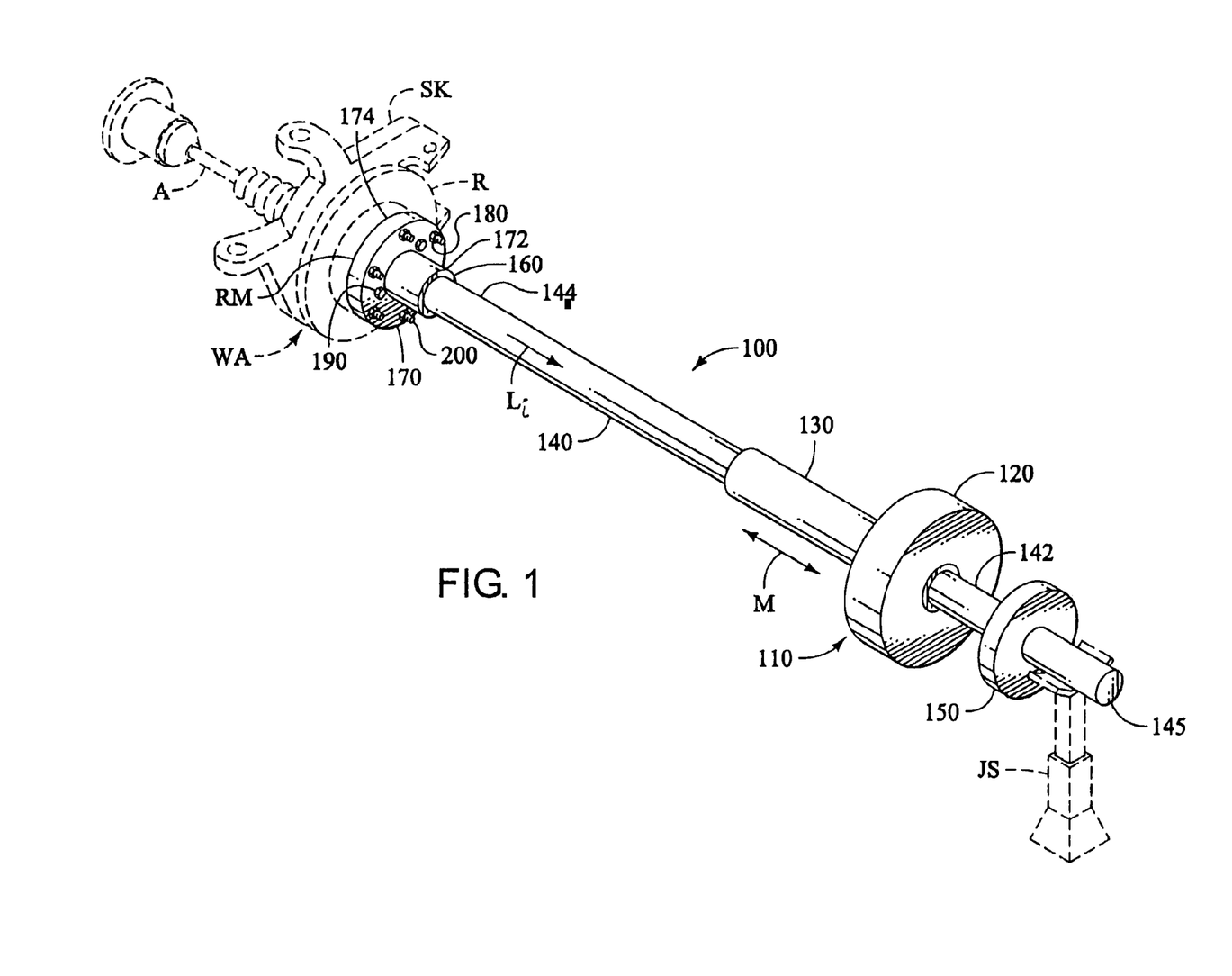
FIG. 1 is an elevation view, in reduced scale, of a wheel assembly removal apparatus according to the present invention shown attached to a wheel assembly.

With reference now to the accompanying figures and specifically to FIG. 1, in one of the many preferable configurations, the wheel assembly removal apparatus 100 incorporates, among other elements, a slide hammer assembly 110 that includes a hammer 120 secured to a hollow slide tube 130. The hollow slide tube 130 is received on a hollow or solid slide shaft 140 upon which the hollow slide tube 130 and hammer 120 can be moved, as indicated generally by arrows identified by reference letter M.

The slide shaft 140 incorporates a hammer stop 150 near the distal end 142 and a distally projecting support extension 145. A coupler 160 is formed at the proximal end 144 of the slide shaft 140 and is configured to releasably engage an interchangeable rotor securing tool 170. The interchangeable rotor securing tool 170 releasably attaches to the coupler 160 at the distal end 172 and to a rim mounting surface RM at the proximal end 174.

In additional alternative, optional, and preferred configurations, the coupler 160, instead of being incorporated in the form of the extending stem with distal end 172, may be formed as an integral and flush feature. More specifically, the rotor securing tool 170 may take the form of a large, flat disk with threads or other attachment features included in a generally central bore approximately in the same position as the coupler 160 shown in the various figures. One possibly desirable variation can simply incorporate a centrally formed countersunk or through bore that can further include internal threads or other interlocking features to releasably attach proximal end 144 to the modified coupling feature.

In operation, a user rapidly accelerates the hammer 120 and hollow slide tube 130 to generate linear momentum, from the proximal end 144 of the slide shaft 140 to impact the hammer stop 150, which creates an operational impact load, denoted generally by the arrow identified by the reference letter Li, as the hammer 120 strikes the hammer stop 150. The user may grip the hollow slide tube 130 or the hammer 120 to accelerate the hammer assembly 110.

In this way, the user creates and transfers the momentum of the accelerated slide hammer assembly 110 to the wheel assembly WA. Those with skill in the art can understand that the resulting impact load Li is transferred through the slide shaft 140, the coupler 160, and the interchangeable rotor securing tool 170 to the rim mounting surface RM. It has been found that repeated operation of the apparatus 100 in this way can unseize and separate even the most tightly joined wheel assembly components.

One variation of the preceding embodiment includes a plurality of bearings (not shown) in the slide tube 130. The addition of such bearings reduces the friction between the slide shaft 140 and the slide tube 130. Alternatively, the slide shaft 140 may include a plurality of bearings upon which the slide tube 130 travels. Further, the slide tube 130 and slide shaft 140 may include a low friction coating.

Yet another embodiment of the apparatus 100 shown in FIG. 1 incorporates a pneumatic or hydraulic cylinder (not shown) as the slide shaft 140. A pneumatic cylinder may be used as the slide shaft 140 by simply adding a compressed air connection port at either end of the hollow slide tube 140. The modified slide shaft 140 would preferably contain a pneumatic piston that may be connected to the slide hammer assembly 110 in a number of ways recognizable by one with skill in the art. This embodiment would allow the operator to operate the apparatus 100 remotely and to stand clear of all moving components of the apparatus 100, as well as the wheel assembly WA, as it is separated.

The rim mounting surface varies with the type of OEM vehicle. Typically, in one example, the rim mounting surface RM is either on the rotor R or the hub. One with skill in the art can recognize that the wheel assembly WA generally includes a spindle (not shown), a wheel bearing (not shown), a hub (not shown), and a rotor R. The particular wheel assembly WA depicted in FIGS. 1, 2, 3, and 4 illustrates a configuration wherein the rotor R is located on the wheel side of the hub, also the side wherein the apparatus 100 attaches in the referenced figures.

However, there are other types of vehicles in which the hub is on the wheel side of the rotor R, such as late model full size Dodge brand trucks, wherein the wheel assembly removal apparatus 100 is equally effective. The impact load Li generated during operation of the apparatus 100 breaks loose the seized components of the wheel assembly WA, which may include, for example, wheel bearings, hub, rotor R, and axle components, from the spindle and axle A.

The apparatus 100 may be constructed out of virtually any durable and relatively strong and fatigue resistant material. One preferable embodiment utilizes commercially available carbon steel components due to the low cost of carbon steels and their durability and high strength. The apparatus may be constructed out of corrosion resistant and spark resistant materials for use in hazardous environments. Also, the various components of the apparatus 100 may be furnished in a variety of finishes, including for example a painted finish, a coated finish, a dielectric coating, a plated finish, or a galvanized coating.

The preferred embodiment is light enough that a single person can carry and set-up the apparatus 100. Additionally, a high ratio of the weight of the slide hammer assembly 110 to the apparatus 100 weight is preferred. Accordingly, a hollow slide shaft 140 and a small hammer stop 150 are preferred. In this way, the momentum of the moving slide hammer assembly 110 is transferred, on impact with the hammer stop 150, mostly to the wheel assembly WA and energy is not unduly wasted in accelerating unnecessary mass of the apparatus 100.

In one of many variations of the instant invention, the apparatus 100 also preferably includes a plurality of engagement hole patterns 180, each containing at least two engagement holes, formed on the interchangeable rotor securing tool 170. More specifically, one embodiment of the interchangeable rotor securing tool 170 may preferably include a four engagement hole pattern, a six engagement hole pattern, and an eight engagement hole pattern, or more, and all incorporated on a single tool 170. Similarly, additional holes may be formed to facilitate removal of other components of the wheel assembly, such as, for purposes of example but not for purposes of limitation, a wheel bearing assembly. In this instance, additional hole patterns such as hole pattern 190 can be included, which can be used for bolts used to engage wheel bearing components that may need repair and removal via the impact load removal techniques described herein.

Alternatively, the interchangeable rotor securing tool 170 may include a three engagement hole pattern, a five engagement hole pattern, an eight engagement hole pattern on a single tool 170, and combinations thereon. Further, each of the plurality of engagement hole patterns 180 may be formed on individual interchangeable rotor securing tool 170.

Figure 2:
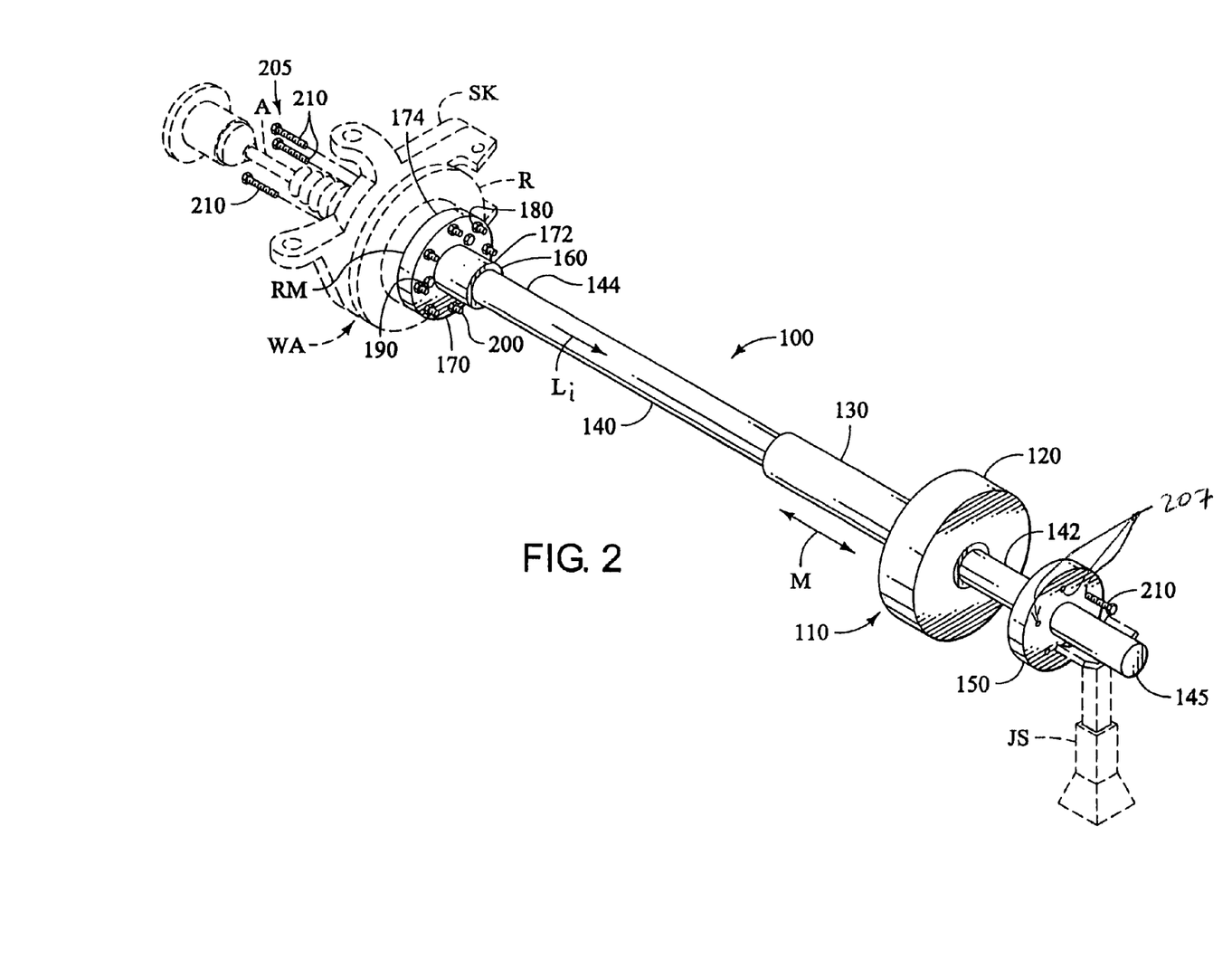
FIG. 2 is an elevation view, in reduced scale, of a variation of a wheel assembly removal apparatus of FIG. 1.
Figure 3:
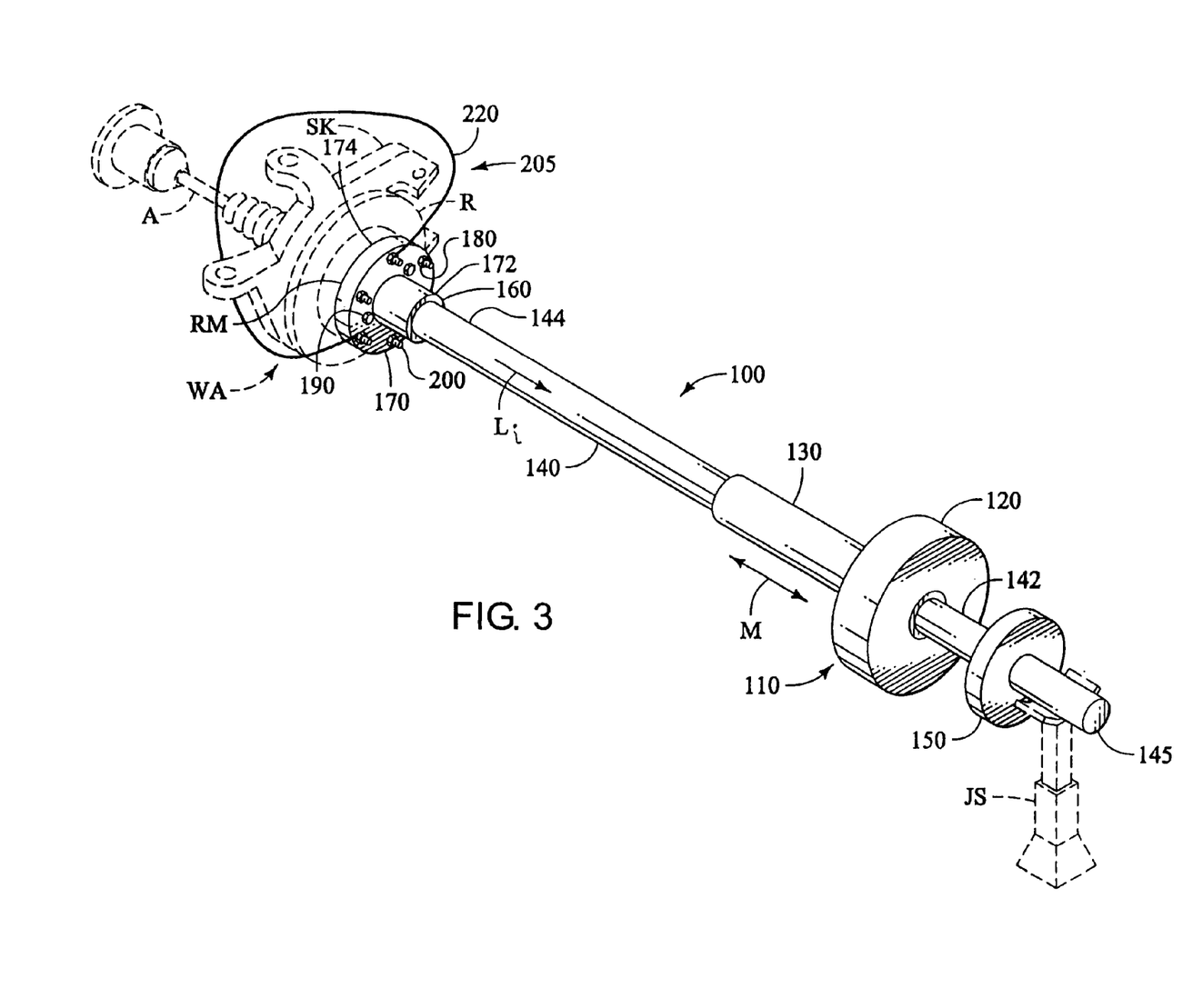
FIG. 3 is an elevation view, in reduced scale, of a modified wheel assembly removal apparatus according to the present invention shown attached to a wheel assembly.
Figure 4:
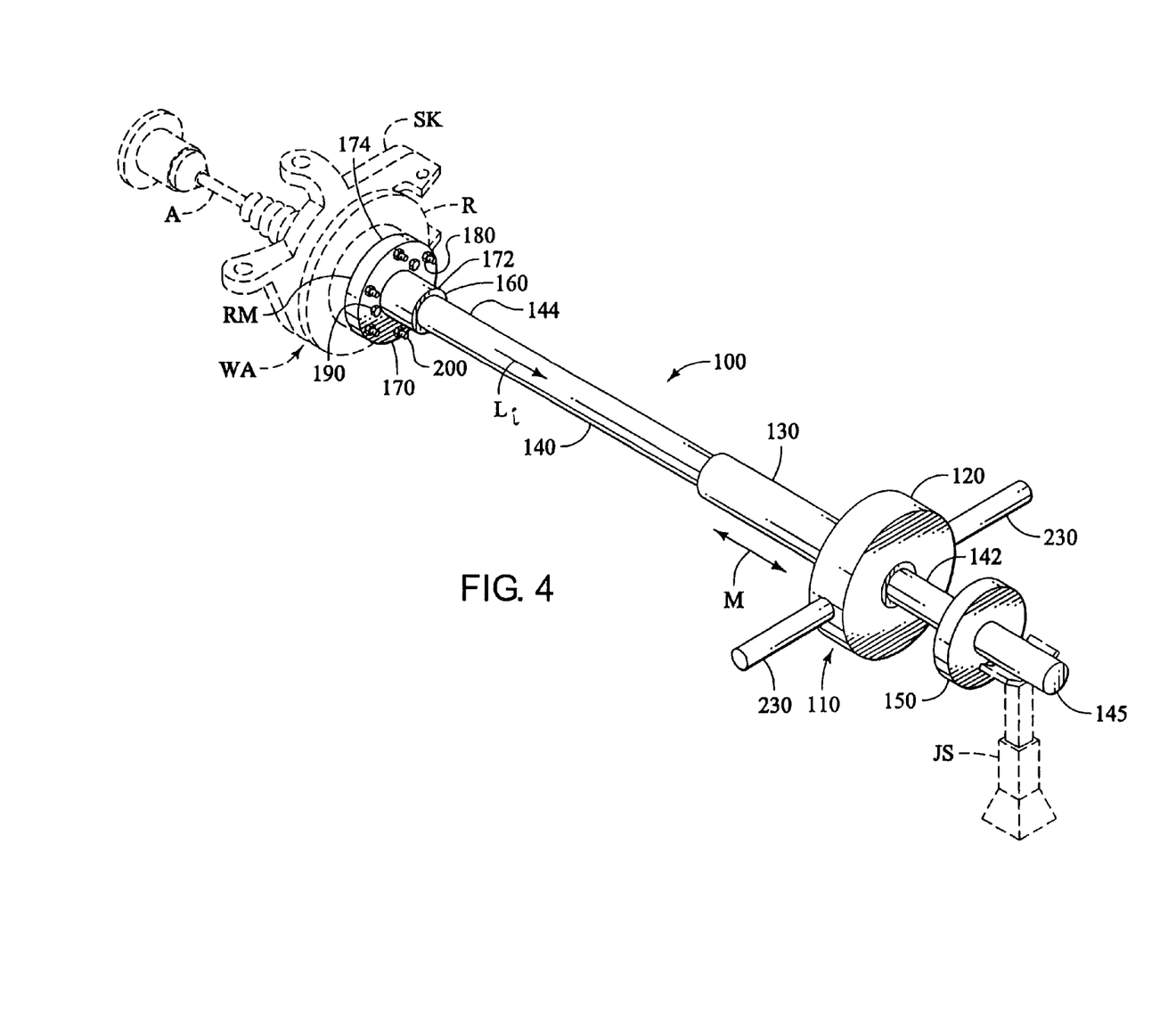
FIG. 4 is an elevation view, in reduced scale, of another variation of the wheel assembly removal apparatus according to the present invention.

These engagement hole patterns 180 are not limited to aligning with engagement members 200, but may also align with the wheel bearing (not shown) removal bolt patterns of many vehicles, such as hole pattern 190. Referring now also to FIGS. 1, 3, and 4, additional modifications are illustrated that include a three engagement hole pattern and a six engagement hole pattern. FIG. 2 illustrates a modified embodiment that incorporates a three engagement hole pattern and an eight engagement hole pattern.

The coupler 160 is preferably adapted to enhance compatibility in that it enables a single slide hammer assembly 110 to be used with any number of interchangeable rotor securing tool 170. Therefore, one slide hammer assembly 110 may be used with any number of interchangeable rotor securing tool 170 that are adapted for both foreign and domestic vehicles, including for example, cars, trucks, vans, buses, aircraft, recreation and military vehicles.

The coupler 160 may take the form of a male threaded connection on the slide shaft 140 for engagement by a female threaded receiver on the interchangeable rotor securing tool 170. Alternatively, one with skill in the art would recognize that the coupler 160 may be formed to include quick release type fasteners, cotter pin type fasteners, bayonet fasteners, and any number of other recognized joining methods.

Additional embodiments of the interchangeable rotor securing tool 170 allow the tool to be securely connected to or coupled to the rim mounting surface to transfer a substantially axial impact load Li approximately uniformly to the rim mounting surface RM. This variation may be used with any of the preceding embodiments and incorporates an interchangeable rotor securing tool 170 that is adapted to be in contact with a substantial portion of the rim mounting surface RM, in addition to engaging the engagement members 200.

While it is preferably that all the engagement members 200 be fastened to the apparatus 100 to maximize the load distribution and minimize the potential for damaging the engagement members 200, the apparatus 100 can function when fastened to at least one engagement member 200. Then, with the engagement members 200 extending through at least one of the engagement hole patterns 180 and fastened to the rotor securing tool 170, the slide shaft 140 is preferably approximately orthogonal to the rim mounting surface RM and will transfer a substantially axial operational impact load Li. Additionally, the substantial amount of contact area of the rim mounting surface RM and the securing tool 170, when properly connected, ensures a substantially distributed load transfer interface for the uniform transfer of loads from the rotor securing tool 170 to the rim mounting surface RM.

Further, the apparatus 100 also preferably can include a support extension 145 at the distal end of the slide shaft 140. The support extension 145 allows the operator to rest the distal end of the apparatus 100 on a jack stand JS. As described before, the operator does not have to support the weight of the apparatus 100 while in use and during setup. Additionally, with the support extension 145 on a jack stand JS the operator can ensure that the slide shaft 140 is substantially level, if desired, and substantially orthogonal to the rim mounting surface RM to therefore transfer the greatest amount of axial force.

An additional variation of the support extension 145 may include a distal end connection for securing additional tools. The apparatus 100 may then be used as a tool to impart compressive impulse forces and may be used, for example, to unseize axles by driving them toward the transmission.

A further variation of any of the preceding embodiments may also include a dual hand operation mechanism 230, as illustrated in FIG. 4. The mechanism 230 operates best with hands of the operator grasping the moving portion of the apparatus 100, namely the hollow slide hammer assembly 110, prior to accelerating the slide hammer assembly 110 on the slide shaft 140. This mechanism 230 minimizes the possibility of the operator getting one a hand caught between the slide hammer assembly 110 and the hammer stop 150.

One embodiment of the dual hand operation mechanism includes two spring loaded handles secured to the hammer 120. A pin (not shown) extends from the handles through the hammer 120 to the slide shaft 140. In this embodiment the slide shaft 140 includes a plurality of ledges (not shown) that engage the pins.

To slide the slide tube 130 and hammer 120 along the slide shaft 140, the user must place one hand on each handle and pull the handles, and therefore the push pins, outward away from the slide shaft 140, therefore disengaging the pins and ledges. One with skill in the art would recognize the myriad of potential dual hand mechanisms 230 that may be successfully applied to this apparatus 100 in the context of the preceding descriptions.

A further variation of any of the preceding embodiments may include a non-slip gripping surface on the hollow slide tube 130, the hammer 120, and the operation mechanism 230. The surface textures may include, for example, work and grip surfaces that are also formed to have stipple and or dimple patterns of raised portions. Further, the hollow slide tube 130 and the operation mechanism 230 may include grip type devices that conform to the shape of a hand gripping a cylindrical object.

Any of the preceding configurations and embodiments may also be adapted to include any one of a number of releasably engagable retainer assemblies. This retainer assembly 205 loosely retains the wheel assembly WA to the vehicle chassis so that the operator, apparatus 100, and the wheel assembly WA are controlled when the impact load Li breaks free the seized components.

The retainer assembly 205 may, in one variation, include at least one fastener. One such embodiment incorporates at least one retainer bolt 210 that loosely secures the wheel assembly WA to the vehicle chassis during operation. For example, in one of many possible applications as shown in FIG. 2, the OEM bolts that are used to tightly secure the bearing of the wheel assembly WA to the steering knuckle SK or chassis are removed and replaced with at least one fastener that may be extra long bolts, such as bolts approximately 2" to 8" long, or longer as needed, which enable the wheel assembly to break free when the impact load Li is applied.

Further, the retainer bolts 210 restrain the wheel assembly WA and apparatus 100 to the vehicle to control the breakaway of the wheel assembly WA from the vehicle and prevent the wheel assembly WA and the apparatus from dropping to the ground. In other alternative arrangements, the at least one fastener or retainer bolt 210 can also include a lug nut, an expandable bolt, a locking shear pin, a flexible strap, any of which can be used alone, in place of, or in combination with the at least one fastener, as well as in combinations of any of such components. Additionally, a jack stand JS may be located under the coupler 160 to control the weight of the wheel assembly WA and the apparatus 100 when the wheel assembly WA breaks free.

Also, further embodiments of the releasably engagable retainer assembly 205 incorporates at least one flexible and adjustable retainer device 220, as illustrated in FIG. 3. The flexible and adjustable retainer device 220 may preferably be formed from chains, wire ropes, elastomeric restraints, bungees, and any number of strap like devices and combinations thereof. These flexible adjustable retainer devices 220 may be releasably engaged by the interchangeable rotor securing tool 170 or the slide shaft 140 and may be wrapped around and through the wheel assembly chassis mount, steering knuckle SK, or virtually any vehicle member that is securely attached to the frame.

Any of the preceding configurations and embodiments may also be adapted to include a means for attaching the releasably engagable retainer assembly 205 to the apparatus 100 when not in use. One such embodiment may include retainer bolt recesses formed into the hammer stop 150 as a storage holder 207 in which the retainer bolts 210 may be secured when the apparatus is not in use, as illustrated in FIG. 2. Additional embodiments may include retainer bolt recesses in the hammer 120, interchangeable rotor securing tool 170, or the device support extension 145. Similar attachment means may be incorporated into the flexible adjustable retainer device 220 embodiments.

As represented in the various figures, the wheel assembly removal apparatus 100 is not necessarily shown to scale but is shown in one of many possible and equally desirable representative relative dimensional proportions, as will be apparent to those with skill in the art. For example, although the wheel assembly removal apparatus 100 is shown to have generally cylindrical components, any of a wide variety of equally suitable cross-sectionally shaped profiles are available and would be compatible for purposes of and contemplated by the wheel assembly removal apparatus 100 of the present invention in any of its described and contemplated embodiments, variations, and modified forms.

Figure 5:
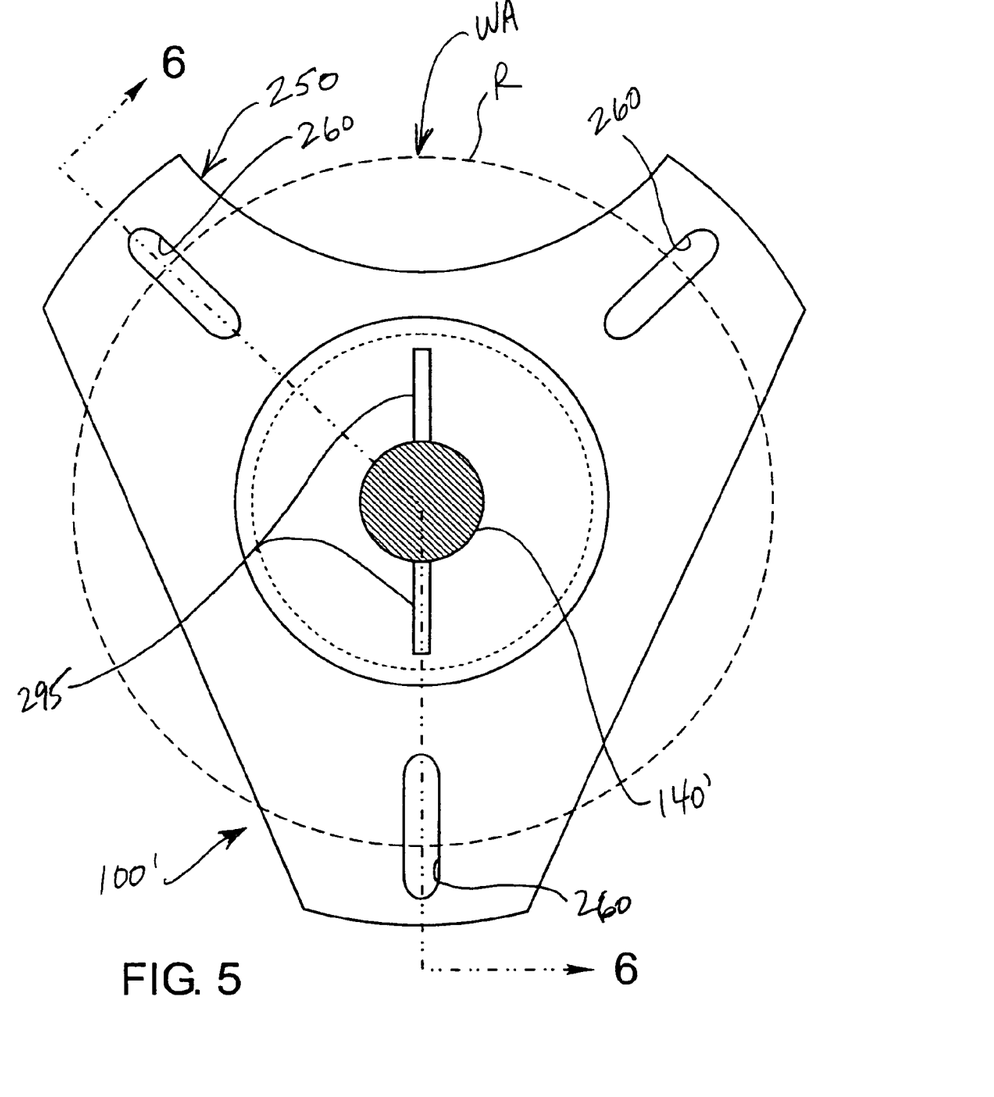
FIG. 5 is a plan view, in reduced scale and with certain structure removed for purposes of illustration, of another variation of the wheel assembly removal apparatus according to the principles.
Figures 6, 7:
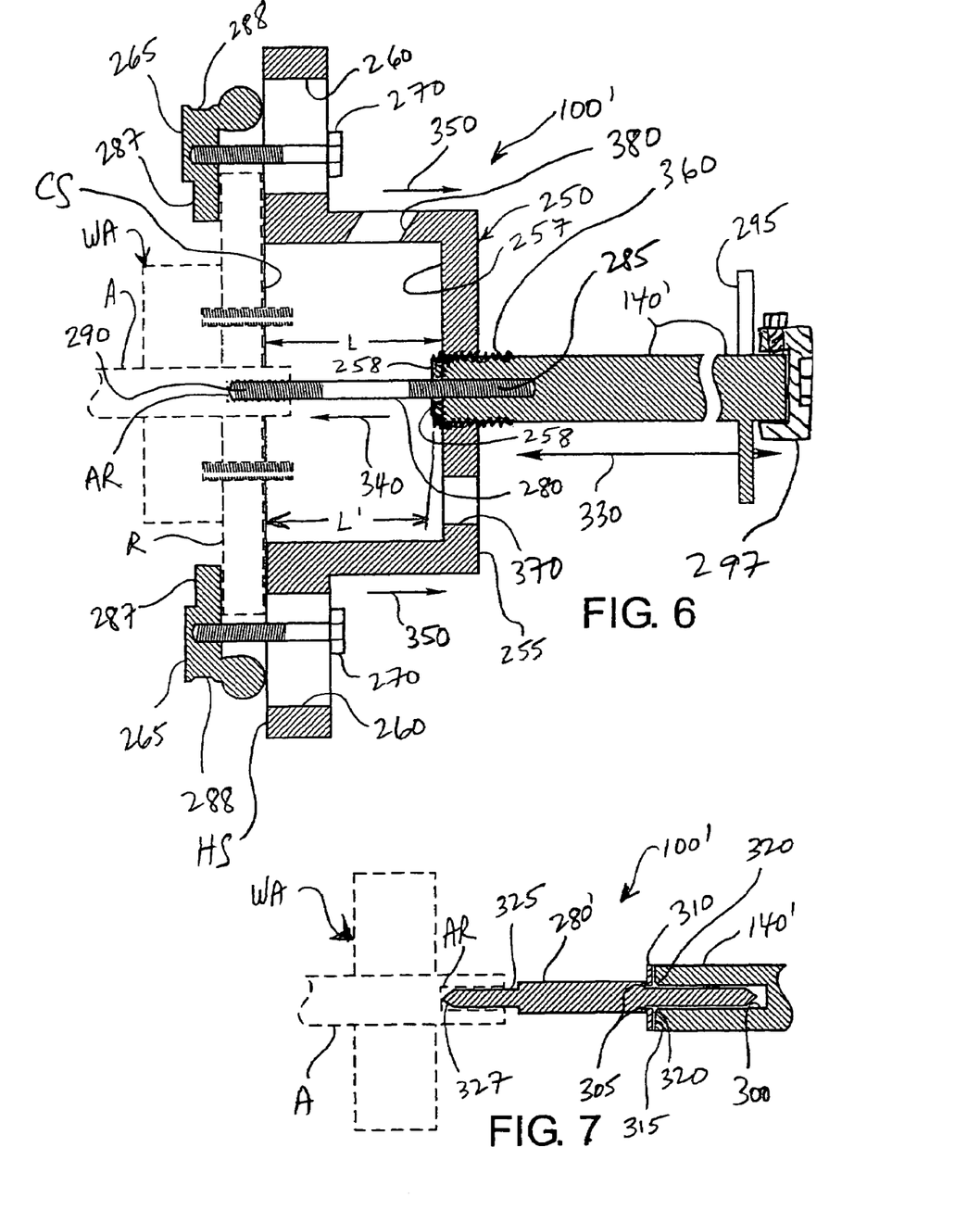
FIG. 6 is a section view, rotated and in modified scale and taken about section line 6-6 of FIG. 5, of the modified wheel assembly removal apparatus of FIG. 5.
FIG. 7 is a partial detail view, in modified scale, of a portion of the structure of FIG. 6 with certain structure removed for purposes of further illustration.

With continued reference to the preceding various figures, reference is now also specifically made to FIGS. 5, 6, and 7, which illustrate another alternative variation that can be included in whole or in part with any of the preceding embodiments and alternatives thereto already described herein. In FIG. 5, those having skill in the art may be able to further understand that the instant invention is also directed to an automotive wheel assembly removal apparatus 100' having an interchangeable rotor securing tool 250 that is similar in certain respects to other embodiments described herein.

However, unlike previous variations and modifications, the instant alternative arrangement of the securing tool 250 incorporates a housing 255 of tool 250 that is preferably formed with a plurality or two or more engagement slots 260 that are adapted to establish an adjustment capability to the interchangeable securing tool 250. In this modified variation, the housing 255 of tool 250 establishes in interior recess that is seated over lugs and hub portions of the contemplated wheel assembly(ies) WA and is further configured to be coupled against the rotor or rotor plate R thereof.

Additionally, the instant alternative arrangement 100' further incorporates a plurality or two or more rocker clamps 265 that cooperate with the slots 260 to clamp a component such as the rotor plate R (FIGS. 5 and 6) thereby securing the interchangeable rotor securing tool 250 to the wheel assembly WA. As can be understood with continued reference to FIG. 6, the rocker clamps 265 can be fastened to the interchangeable rotor securing tool 250 with bolts 270 that can be threaded into the rocker clamps 265 or that can be fastened with nuts (not shown) through holes that may alternatively be formed in the rocker clamps (not shown).

In this arrangement 100', the interchangeable rotor securing tool 250 can be adapted for use with rotor plates such as rotor R as well as any number of differently configured rotor plates having various thicknesses and diametrical dimensions and configurations. For purposes of establishing compatibility with a vast range of wheel assemblies, including wheel assembly WA, the rocker clamps 265 may incorporate one or more reliefs or recessed portions 287, 288 that can be shaped and sized so that the rocker clamps 265 can be positioned inside certain portions of the contemplated wheel assemblies without interference from components and structural features of such wheel assemblies. In this way, fewer components of the wheel assemblies must be removed for purposes of operating the wheel assembly removal apparatuses 100, 100' according to the principles of the instant invention.

With continued reference to FIG. 6, the instant modification also contemplates incorporation of an optional or preferred axle impact shaft, pin, bar, or rod 280 that can be releasably and interchangeably mounted into a slide shaft 140' with threads 285 or any other similarly capable fastening means. The axle impact bar 280 may also be adapted to releasably and or threadably engage the axle A of the wheel assembly WA by having a diameter small enough so as to be received in a recess AR of the axle A, which is sometimes also or alternatively referred to by those skilled in the art as a hard point or axle center point.

Also, axle impact bar 280 may also be optionally or preferably adapted with axle A threads 290 that are adapted to be threaded into OEM service threads that may be formed in the axle recess AR. In this additional configuration, the slide shaft 140' may be further adapted with a rotation handle 295 to facilitate threading the axle impact bar into the axle threads of axle recess AR. Yet other variations may incorporate an integrally formed or otherwise attached wrench socket 297 or the like, such as a ¾" socket, that can be actuated to rotate the slide shaft 140'.

In the configuration wherein the axle impact bar, rod, or pin 280 is configured without threads about any portion thereof (see, for example, FIG. 7), a modified axle impact rod 280' is described that is slidably and rotatably received in the interchangeable rotor securing tool 250 within a slide shaft recess 300 that is formed in the slide shaft 140'.

In variations of the solid core shaft 140', the instant modification may also incorporate a similar construction that employs a hollow tube-type shaft (not shown) whereby the axle 280' can be extracted using an elongated pin inserted through the opposite end of the hollow shaft that can be used to impact the axle bar 280' if it becomes jammed during operation.

In the instant arrangement of FIGS. 5, 6, and 7, the axle impact bar or rod 280' may also further preferably or optionally incorporate a shoulder portion 305 (FIG. 7) that can be seated against a hard steel seat washer 310 that can in turn be seated against the proximate end 315 of the slide shaft 140'. In this modification, the axle rod 280' may be sized whereby the slide shaft recess 300 projects further than the received portion of the axle rod or bar 280' so that the axle bar 280' does not bottom out within the recess 300 and thereby become deformed and jammed into the recess 300.

In this way, in addition to forming the recess 300 to be diametrically larger than the received portion of the axle bar 280', deformation of the axle bar or rod 280' can in most operational circumstances be limited to exterior portions proximate the shoulder portion 305 instead of portions received within the recess 300, which can prevent the axle bar or rod from becoming jammed into the recess 300. For stress relief and to minimize deformation during operation, the proximate end 315 may be further modified to incorporate a blend or chamfer 320. In addition to incorporating any of the preceding anti-deformation and anti-jamming features and capabilities, the opposite end of the axle rod or bar 280' may also be preferably or optionally configured to have a reduced cross-section 325 having a point 327 that can be sized and adapted to automatically seat into the center or hard point axle recess AR of the axle A.

In this alternative non-threaded configuration of the axle bar or rod 280', the operator or user of the contemplated axle impact bar 280' can be assured that all operational impact loads, e.g. Li, are directed along the most desirable load pathway. For example, it can be desirable to have the operational impact load, such as Li, imparted upon the axle A only in one direction while the impact loads imparted upon the rotor R are desirable only in the opposite direction such that the components may be more quickly separated from one another in circumstances where they have become seized or otherwise undesirably joined together.

With continued reference also again to FIG. 6, those having skill in the art will recognize that the stroke 330 of the hammer (such as hammer 120 of FIGS. 1 through 4) moving in the direction of arrow denoted generally by arrow 340 can, in particular coupling configurations of the securing tool 250 and housing 255, impart a shock load and transfer the linear momentum of the hammer stroke primarily or only to the axle bar or rod 280' without any significant force being transmitted through the housing 255 of tool 250 (FIG. 6) of the interchangeable rotor securing tool 250, as is further detailed hereinbelow.

In the context of the structural configuration needed to accomplish this possibly preferred capability, the alternative axle rod, pin, bar, or shaft 280' (FIG. 7) is incorporated into the assembly of interchangeable tool 250 (FIG. 6) so that a minimum distance L is established between the coupling surface CS of the rotor R (FIG. 6) and the interior surface 257 of the housing 255, to have a distance that is greater, even if only slightly greater, than the distance denoted by reference letter L' (FIG. 6). Where L' is measured between the housing coupling surface HS (FIG. 6) and end or surface 258 of the modified slide shaft 140', which is tightened towards the coupling surface CS to extend into the interior of the housing 255. With use of the hard and tempered steel materials contemplated for use with the instant invention, even the smallest of differences between L and L' can establish significant compressive forces so as to ensure preferred or optional pre-loading of the housing 255 and the axle rod 280, 280' during operation of the slide hammer 120. In this way, compressive forces can be imparted in the direction of arrow 340 (FIG. 6) upon pin 290 and against axle recess AR and axle A.

To further explicate the currently illustrated modification of FIGS. 5, 6, and 7, in operation, the instant configuration 100' of the interchangeable rotor securing tool 250 and the slide hammer (such as hammer 120 shown for example in FIGS. 1 through 4) are operated as explained in connection with embodiments described elsewhere herein and in the directions generally denoted by reference arrow labeled 330, but also so as to establish impact loads that are also imparted against the securing tool 250, as well as the hammer stop 150 (FIGS. 1 through 4), as can be understood with reference to direction arrows labeled 340, 350.

Such additional operational impact loads will operate to effectively separate the rotor plate R away from the wheel assembly WA. In this illustrated configuration, impact loads can be communicated to the rotor plate R in one direction denoted by arrow 350 and to the axle A generally in the opposite direction of force arrow 340.

Even more preferably, for further improved predictive load pathway capabilities, the axle rod 280' (FIG. 7) can be incorporated and adjusted to be in compression between the axle A of the wheel assembly WA and the housing 255 of the rotor securing tool 250 by rotation of the slide shaft 140'. This adjustment capability of the slide shaft 140' and axle impact bar 280' combination can be preferably established by incorporating optional or preferred threads 360 (FIG. 6). In this threaded and adjustable variation, the housing 255 can be coupled to the rotor plate R whereby the rocker clamps 265 are initially positioned and loosely fastened to the slots 260.

Next, the slide shaft 140' (being received with the alternative axle impact rod or bar 280') is rotated to put the bar or rod 280' into compression as noted and depicted. Then, the rocker clamps 265 are further tightened to clamp the housing 255 of the interchangeable rotor securing tool 250 to the rotor plate R. Next, the slide hammer 120 is actuated through one or more one cycles as desired and in the directions of arrow 330 outwardly in the direction of arrow 350 and then in the opposite direction of arrow 340.

As the rotor plate R begins to separate from the wheel assembly WA, the slide shaft 140' is further tightened to increase and or to reestablish the compressive force upon the axle impact bar or rod 280'. In the circumstance where the wheel assembly WA components do not commence separation, a heating source such as an acetylene torch can be employed and can utilize one or more apertures 370, 380 (FIG. 6) that can be preferably or optionally formed in the housing 255 to receive a nozzle of such a torch.

Such a heating source can be then directed at the appropriate structures of the wheel assembly WA to impart additional temperature differential induced stresses across the interface between the wheel assembly WA components that are seized together. As the components of the wheel assembly WA are heated to dissimilar temperatures, the hammer cycle steps explicated here are repeated and separation of the previously seized components will then be accomplished.

Figures 8, 9:
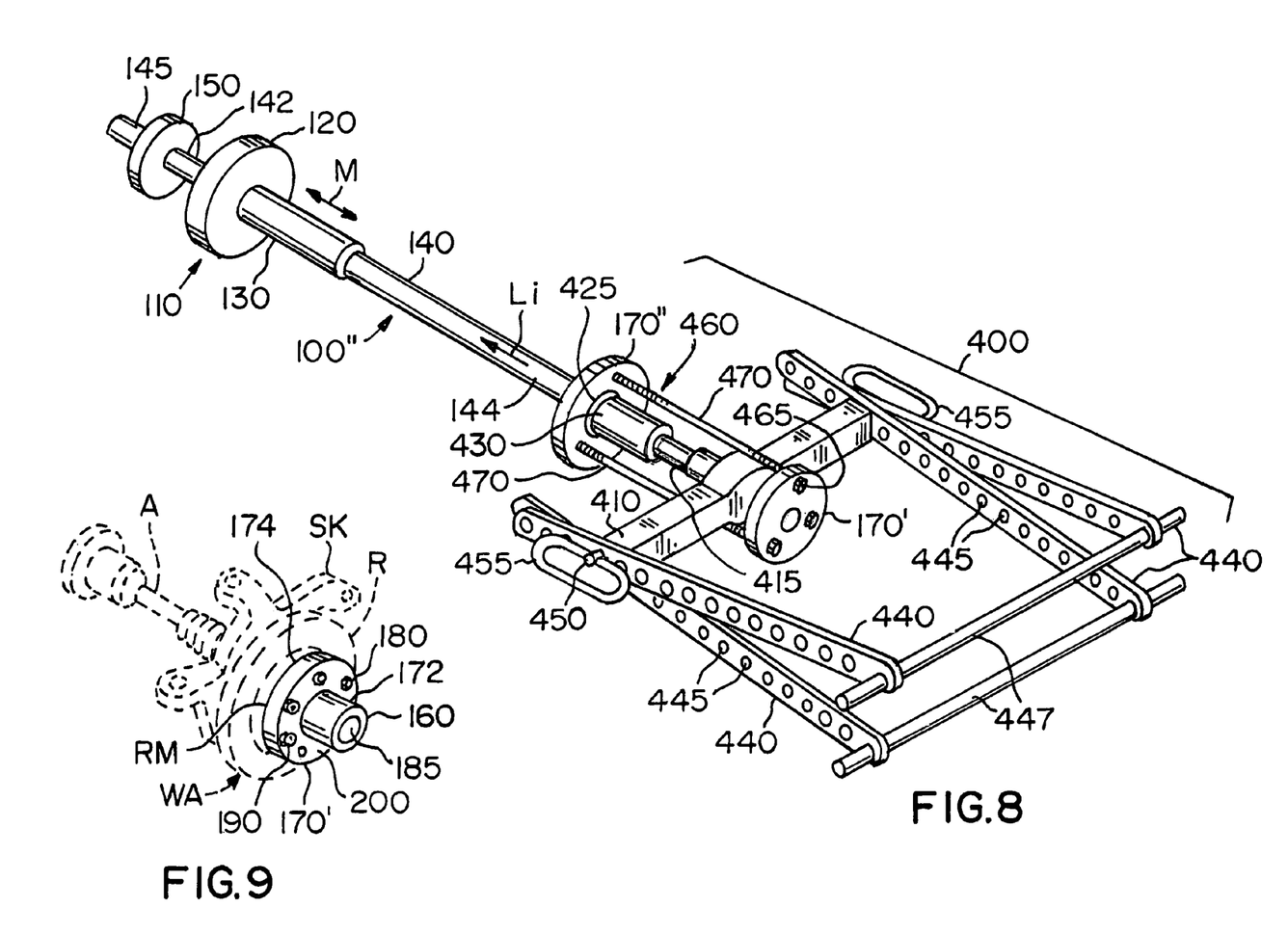
FIG. 8 is an elevated perspective view, in modified scale, of another variation of the preferred embodiments that can include various hydraulic assist components.
FIG. 9 is a detail view of a portion of the assembly depicted in FIG. 8.

With continued reference to the various figures and now also to FIG. 8, those skilled in the art may comprehend additional variations compatible for independent use or use in combination with any of the preceding embodiments. Specifically, a modification is contemplated wherein an automotive wheel assembly removal apparatus 100" is adapted as before to be connected to a wheel assembly and to include a slide hammer assembly 110 having a slide-tube 130 mounted hammer 120 received on a slide shaft 140 with a distal hammer stop 150 and a proximal end 144 with a coupler 160.

As can be understood from FIG. 9, a modified interchangeable rotor securing tool 170' can be mounted to the coupler 160 and be adapted with at least one engagement hole pattern. A further modified configuration contemplates a tensioner coupling feature 185 that can be formed from any number of possible fastening features, including, for purposes of example without limitation, fastener threads.

A tensioner assembly 400 is also included and can incorporate a second interchangeable rotor securing tool such as modified tool 170', as well as another interchangeable rotor securing tool 170". The tensioner assembly 400 is further directed to a cross bar 410 having a generally centrally positioned central bore 415. The central bore 415 is preferably sized to be received about the second interchangeable rotor securing tool. Even more preferably, the central bore 415 is sized and positioned for receipt about coupler 160 of the rotor securing tool 170'.

In operation, the cross bar 410 imparts loads to the other components of the tensioner assembly 400 but does not typically come in contact with or otherwise impart any forces or loads to or against the second interchangeable rotor securing tool 170'. In this way, the contemplated tension loads are established between the rotor securing tools 170' and 170"

This arrangement sets up a preload there between to improve the removal capability of the removal assemblies 100, 100', 100" in the many contemplated configurations. Experience has proven that establishing a preloading tension between the rotor R that has become seized, and the vehicle chassis such as wheel assembly WA can drastically reduce the time needed to remove the rotor R and or other components of the wheel assembly WA.

Figures 10, 11:
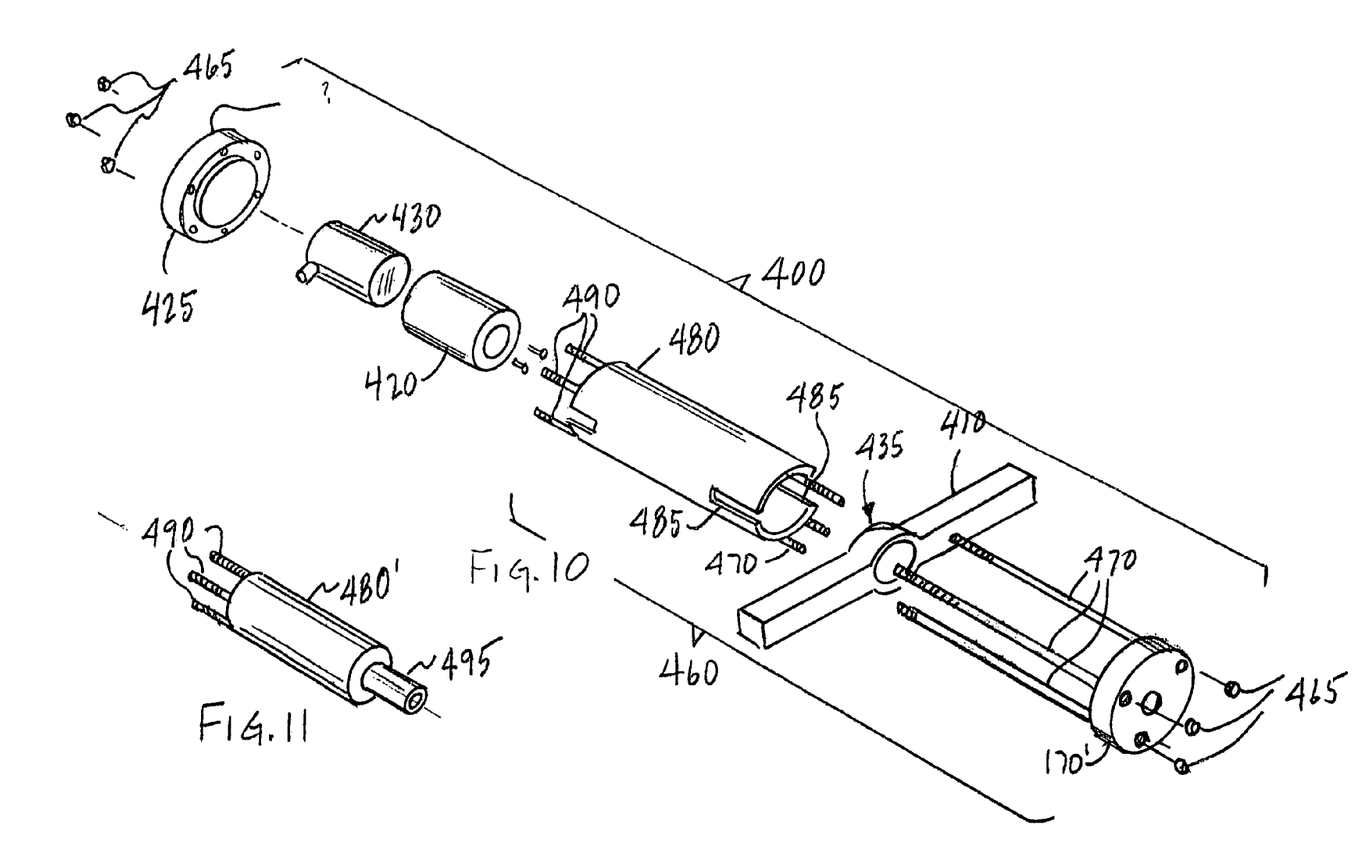
FIG. 10 is an exploded view of various of the elements of the modification of FIG. 8.
FIG. 11 is a detail view of a modified component of the assembly of FIGS. 8 and 10.

As may be understood with reference also now to FIG. 10, additional modified optional or preferred embodiments may adopt the tensioner assembly 400 to be configured to receive a plunger-cylinder assembly 430. The plunger-cylinder assembly can be seated between the cross bar and the slide hammer assembly 110 in a compression arrangement, but to impart tension forces between the rotor securing tools 170' and 170". Many possible plunger cylinders are compatible for use with the instant invention and can include, for illustration purposes without limitation, the RCS-101 and related series plunger cylinders available from ENERPAC, www.enerpac.com.

In various optional or preferred arrangements, the plunger cylinder assembly can be a manually or automatically actuated pneumatic, hydraulic, pneudraulic, and similarly capable device that can impart substantial forces, which will enhance the preload that can be developed during operation. An optional push cap 420 (FIG. 10) can be included between the cylinder plunger 430 and the cross bar 410 for configurations where an additional spacer may needed to accommodate the particular geometry of the removal operation.

Optional or preferred counter bores may be formed in the interchangeable rotor securing tool 170" and the cross bar 410 for added convenience in seating the plunger cylinder. For example, counter bore seat 425 (FIGS. 8, 10) can be formed in securing tool 170", and a counter bore seat 435 (FIGS. 8, 10) can be similarly formed in the cross bar 410 to enable more straightforward centering of the plunger cylinder assembly 430 in the tensioner assembly 400.

A tension link assembly 460 is fastened in the tensioner assembly 400 between the interchangeable rotor securing tools 170', 170". A plurality of push links 440 are adjustably and movably pinned to opposite ends of the cross bar 410. A series of adjustment apertures 445 can be included whereby push link pins 450 can engage the push links 440 to the ends of the cross bar 410. Further, the pins 450 can include handles 455 for lifting and positioning the tensioner assembly 400.

Preferably, each of the plurality of push links 440 is configured to be long enough to extend between the tensioner assembly 400 and to urge and seat against the vehicle chassis, such as the wheel assembly WA and components thereof. In optional embodiments, the push links 440 can further include straight or curved or specially shaped push rods 447. Although push rods 447 are shown in FIG. 8 to be straight, which is especially useful when needed to urge against leaf-spring-type under carriage components, many other optional push rod 447 configurations are contemplated to accommodate use of the tensioner assembly 400 with rocker arms, control arms, chassis frame longerons, and other under carriage structures that may be available on a given vehicle for establishing a firm seat against which the removal apparatus 100, 100', 100" can be situated.

In one possibly preferred or optional arrangement, the tension link assembly 460 can incorporate a plurality of tension rods 470 that can be secured with what are commonly referred to by those skilled in the automotive arts as lug nuts 465 (FIG. 10). The tension rods 470 can be received in existing engagement holes of the contemplated hole patterns discussed elsewhere herein. Alternatively, additional hole patterns can be formed with through holes for use with the tension rods 470.

In other alternative adaptations, the lug nuts 465 are not needed when the tension rods 470 can be threaded into integral bores that can be formed in the rotor securing tools 170, 170', 170". In each of these possible variations, the objective is to balance the tensile loads and it is recommended that at least two and more preferably three or more tension rods 470 be used as described.

Further modifications to any of the preceding embodiments can optionally or preferably include a differently configured tension link assembly 460 wherein a tension cylinder 480 is used alone and or in combination with the tension rods 470. In FIGS. 10 and 11, those knowledgeable in the relevant arts may come to know that the instant invention can incorporate the tension cylinder 480 to be a generally hollow tube with cross bar clearance slots 485 and lug bolts 490 that can be integrally formed about the cylinder 480.

In other variations, a modified tension cylinder 480' may be adapted with a tension stem 495 (FIG. 11), which is adapted with internal fastening means such as threads configured to threadably receive the tensioner coupling feature 185. In this modification, the tensioner stem 495 is sized for receipt through the central bore 415 of the cross bar 410 and to be threadably received on the tensioner coupling feature 185 formed on the coupler 160 of the rotor securing tool 170'.

Numerous alterations, modifications, and variations of the preferred embodiments, configurations, modifications, variations, and alternatives disclosed herein will be apparent to those skilled in the art and they are all contemplated to be within the spirit and scope of the instant invention. For example, although specific embodiments have been described in detail, those with skill in the art can understand that the preceding embodiments and variations can be further modified to incorporate various types of substitute and/or additional materials, components, shapes, relative arrangement of elements, and dimensional and proportional configurations.

Such optional or preferred variations can be particularly well-adapted for compatibility with the wide variety of industrial, commercial, and professional vehicle maintenance service environments known to those working in the field and available in the respective industries. Accordingly, even though only few variations of the present invention are described herein, it is to be understood that the practice of such additional modifications and variations and the equivalents thereof, are within the spirit and scope of the invention as defined in the following claims.

The invention claimed is:

1. An automotive wheel assembly removal apparatus adapted to be connected to a wheel assembly and operative to remove the wheel assembly from a vehicle chassis, comprising:
   a slide hammer assembly for creating an operational impact load that includes a slide-tube mounted hammer received on a slide shaft having a distal hammer stop and a proximal end with a coupler;
   an interchangeable rotor securing tool mounted to the coupler and formed with at least one engagement hole pattern;
   a tensioner assembly that incorporates a second interchangeable rotor securing tool and formed with a respective at least one engagement hole pattern;
   a cross bar with a generally central bore received about the second interchangeable rotor securing tool;
   the tensioner assembly adapted to receive a plunger-cylinder assembly for compressive seating between the cross bar and the slide hammer assembly;
   a tension link assembly secured between the interchangeable rotor securing tools; and
   a plurality of push links adjustably and movably pinned to opposite cross bar ends and adapted with a length to seat and urge against the vehicle chassis.

2. The apparatus according to claim 1, further comprising:
   a plurality of tension rods forming the tension link assembly.

3. The apparatus according to claim 1, further comprising:
   a tension cylinder forming the tension link assembly and to have a plurality of lug bolts at each end positioned to secure the interchangeable rotor securing tools.

4. The apparatus according to claim 1, further comprising:
   a tension cylinder forming the tension link assembly and to have a plurality of lug bolts at an end positioned to secure the interchangeable rotor securing tool attached to the slide hammer assembly, and at an opposite end a tension stem adapted to receive a tensioner coupling feature formed about the coupler of the second rotor securing tool.

5. A means for removing an automotive wheel assembly from a vehicle chassis, comprising:
   a means for generating linear momentum;
   a means for slidably receiving the momentum generating means;
   a means for linearly transferring the momentum of the momentum generating means to the receiving means, the transferring means being formed at a distal end of the receiving means and the receiving means being adapted to transfer to the linear momentum to the wheel assembly;
   a means for communicating the linear momentum from the slidably receiving means to an axle of the wheel assembly;
   a means for adjustably and proximally coupling the receiving means being carried from the receiving means;
   and an interchangeable means for imparting the linear momentum to the wheel assembly, the interchangeable means being releasably attached to the coupling means and being configured to be adjustably coupled to the wheel assembly.

6. The means for removing an automotive wheel assembly from a vehicle chassis according to claim 5, further comprising: a means for adjustably clamping the interchangeable means to the wheel assembly to thereby couple the interchangeable means to the wheel assembly and for pretensioning the interchangeable means against the wheel assembly.

7. An apparatus for removing an automotive wheel assembly from a vehicle chassis comprising:
   a linear actuator;
   a cross bar;
   a rotor securing tool connected on one side to the linear actuator and adapted on the other side to connect to a rotor of the wheel assembly; and
   at least one push link connected to the cross bar and adapted to seat and urge against a vehicle chassis;
   the linear actuator being configured to apply a load to the cross bar such that the load is transferred through the push link to the vehicle chassis in a direction parallel to the axel of the wheel assembly.

8. The apparatus of claim 7, wherein the linear actuator is a pneumatic, hydraulic or pneudraulic device.

9. The apparatus of claim 7, wherein the linear actuator is a plunger cylinder.

10. The apparatus of claim 7, further comprising rocker clamps attached to the rotor securing tool.

11. The apparatus of claim 7, further comprising a slide hammer assembly connected to the linear actuator on the side of the linear actuator opposite to the side which is connected to the rotor securing tool.

12. The apparatus of claim 7, further comprising a counter bore seat in the rotor securing tool.

* * * * *